(12) United States Patent
Stentiford

(10) Patent No.: US 7,593,602 B2
(45) Date of Patent: Sep. 22, 2009

(54) SEARCHING IMAGES

(75) Inventor: Frederick W M Stentiford, Woodbridge (GB)

(73) Assignee: British Telecommunications plc, London (GB)

( * ) Notice: Subject to any disclaimer, the term of this patent is extended or adjusted under 35 U.S.C. 154(b) by 812 days.

(21) Appl. No.: 10/537,540

(22) PCT Filed: Nov. 24, 2003

(86) PCT No.: PCT/GB03/05096

§ 371 (c)(1),
(2), (4) Date: Jun. 3, 2005

(87) PCT Pub. No.: WO2004/057493

PCT Pub. Date: Jul. 8, 2004

(65) Prior Publication Data

US 2006/0050993 A1    Mar. 9, 2006

(30) Foreign Application Priority Data

Dec. 19, 2002  (GB) ................................ 0229625.9

(51) Int. Cl.
*G06K 9/54*  (2006.01)
*G06K 9/60*  (2006.01)
*G06K 9/00*  (2006.01)
*G06K 9/34*  (2006.01)
*H04N 1/00*  (2006.01)
*G06F 7/00*  (2006.01)
*G06F 17/30*  (2006.01)

(52) U.S. Cl. ........................ 382/305; 382/117; 382/173; 358/403; 707/1

(58) Field of Classification Search .................. 382/305
See application file for complete search history.

(56) References Cited

U.S. PATENT DOCUMENTS 4,646,352 A    2/1987  Asai et al.

(Continued)

FOREIGN PATENT DOCUMENTS

EP    0098152    1/1984

(Continued)

OTHER PUBLICATIONS

International Search Report mailed Feb. 9, 2006 in International Application No. PCT/GB2005/003339.

(Continued)

*Primary Examiner*—Brian P Werner
*Assistant Examiner*—Jose M Torres
(74) *Attorney, Agent, or Firm*—Nixon & Vanderhye PC

(57) ABSTRACT

A database of visual images includes metadata having, for a particular image, at least one entry specifying: a part of that image, another stored image, and a measure $S_{abi}$ of the degree of similarity between that specified part and the specified other image. One or more images are displayed and input is received from a user (for examples, by using a gaze tracker) indicative of part of the displayed images. Measures of interest are determined for each of a plurality of non-displayed stored images specified by the metadata for the displayed image(s), as a function of the similarity measure(s) and the relationship between the user input and the part specified. On the basis of these measures, a selection is made from those non-displayed stored images of further images for display.

16 Claims, 2 Drawing Sheets

U.S. PATENT DOCUMENTS

| | | | |
|---|---|---|---|
| 5,113,454 | A | 5/1992 | Marcantonio et al. |
| 5,200,820 | A | 4/1993 | Gharavi |
| 5,303,885 | A | 4/1994 | Wade |
| 5,790,413 | A | 8/1998 | Bartusiak et al. |
| 5,825,016 | A | 10/1998 | Nagahata et al. |
| 5,867,813 | A | 2/1999 | Di Pietro et al. |
| 5,978,027 | A | 11/1999 | Takeda |
| 6,094,507 | A | 7/2000 | Monden |
| 6,111,984 | A | 8/2000 | Fukasawa |
| 6,240,208 | B1 | 5/2001 | Garakani et al. |
| 6,266,676 | B1 | 7/2001 | Yoshimura et al. |
| 6,282,317 | B1 | 8/2001 | Luo et al. |
| 6,304,298 | B1 | 10/2001 | Steinberg et al. |
| 6,389,417 | B1 | 5/2002 | Shin et al. |
| 6,608,615 | B1* | 8/2003 | Martins ........................ 345/156 |
| 6,778,699 | B1 | 8/2004 | Gallagher |
| 6,934,415 | B2 | 8/2005 | Steintiford |
| 7,046,924 | B2* | 5/2006 | Miller et al. ................... 396/51 |
| 7,076,118 | B1* | 7/2006 | Westerman ................... 382/305 |
| 7,327,890 | B2* | 2/2008 | Fredlund ...................... 382/218 |
| 2001/0013895 | A1 | 8/2001 | Aizawa et al. |
| 2002/0081033 | A1 | 6/2002 | Stentiford |
| 2002/0126891 | A1 | 9/2002 | Osberger |
| 2004/0120606 | A1* | 6/2004 | Fredlund ...................... 382/305 |
| 2005/0031178 | A1 | 2/2005 | Park |
| 2005/0074806 | A1 | 4/2005 | Skierczynski et al. |
| 2005/0169535 | A1 | 8/2005 | Stentiford |
| 2006/0050993 | A1 | 3/2006 | Stentiford |

FOREIGN PATENT DOCUMENTS

| | | |
|---|---|---|
| EP | 1126411 A1 | 8/2001 |
| EP | 1286539 A1 | 2/2003 |
| GB | 1417721 | 12/1975 |
| JP | 3-238533 | 10/1991 |
| JP | 10-260773 | 9/1998 |
| JP | 2000-207420 | 7/2000 |
| JP | 2002-50066 | 2/2002 |
| JP | 2003-187217 | 7/2003 |
| WO | WO 82/01434 | 4/1982 |
| WO | WO 90/03012 | 3/1990 |
| WO | WO 99/05639 | 2/1999 |
| WO | WO 99/60517 | 11/1999 |
| WO | WO 00/33569 | 6/2000 |
| WO | WO 01/31638 A1 | 5/2001 |
| WO | WO 01/61648 A2 | 8/2001 |
| WO | WO 02/21446 A1 | 3/2002 |
| WO | WO 02/098137 A1 | 12/2002 |
| WO | WO 03/081523 A1 | 10/2003 |
| WO | WO 03/081577 A1 | 10/2003 |
| WO | WO 2004/042645 A1 | 5/2004 |
| WO | WO 2004/057493 A2 | 8/2004 |
| WO | WO 2005/057490 A2 | 6/2005 |
| WO | WO 2006/030173 A1 | 3/2006 |

OTHER PUBLICATIONS

Chang et al., "Fast Algorithm for Point Pattern Matching: Invariant to Translations, Rotations and Scale Changes", Pattern Recognition, vol. 30, No. 2, Feb. 1997, pp. 311-320.

M. E. J. Wood, N. W. Campbell and B. T. Thomas, "Iterative Refinement by Relevance Feedback in Content-Based Digital Image Retrieval," *Proceedings of the Sixth ACM International Conference on Multimedia*, Sep. 12, 1998, pp. 13-20.

Office Action dated Oct. 27, 2006 in EP 03 778 509.4-2201.

Office Action dated Mar. 4, 2008 in JP Patent Application No. 2004-561596 with English translation.

International Search Report dated Jun. 12, 2003.

International Search Report dated Mar. 18, 2002.

European Search Report dated Jan. 8, 2003 for RS 018248 GB.

European Search Report dated Jan. 9, 2003 for RS 108249 GB.

European Search Report dated Jan. 9, 2003 for RS 108251 GB.

European Search Report dated Jan. 8, 2003 for RS 108250 GB.

Lutton et al., "Contribution to the Determination of Vanishing Points Using Hough Transform", 1994 IEEE Transactions on Pattern Analysis and Machine Intelligence, vol. 16, No. 4, Apr. 1994, pp. 430-438.

McLean et al., "Vanishing Point Detection by Line Clustering", IEEE Transactions on Pattern Analysis and Machine Intelligence, vol. 17, No. 11, Nov. 1995, pp. 1090-1095.

Koizumi et al., "A New Optical Detector for a High-Speed AF Control", 1996 IEEE, pp. 1055-1061.

Itti et al., "Short Papers: A Model of Saliency-Based Visual Attention for Rapid Scene Analysis", IEEE Transactions on Pattern Analysis and Machine Intelligence, vol. 20, No. 11, Nov. 1998, pp. 1254-1259.

Shufelt, "Performance Evaluation and Analysis of Vanishing Point Detection Techniques", In Analysis and Machine Intelligence, vol. 21, No. 3, Mar. 1999, pp. 282-288.

Wixson, "Detecting Salient Motion by Accumulating Directionally-Consistent Flow", IEEE Transactions on Pattern Analysis and Machine Intelligence, vol. 22, No. 8, Aug. 2000, pp. 774-780.

Privitera et al., "Algorithms for Defining Visual Regions-of-Interest: Comparison with Eye Fixations", IEEE Transactions on Pattern Analysis and Machine Intelligence, vol. 22, No. 9, Sep. 2000, pp. 970-982.

Smeulders et al., "Content-Based Image Retrieval at the End of the Early Years", IEEE Transactions on Pattern Analysis and Machine Intelligence, vol. 22, No. 12, Dec. 2000, pp. 1349-1380.

Vailaya et al., "Image Classification for Content-Based Indexing", IEEE Transactions on Image Processing, vol. 10, No. 1, Jan. 2001, pp. 117-130.

Almansa et al., "Vanishing Point Detection Without Any A Priori Information", IEEE Transactions on Pattern Analysis and Machine Intelligence, vol. 25, No. 4, Apr. 2003, pp. 502-507.

Zhao et al., "Morphology on Detection of Calcifications in Mammograms", 1992 IEEE, pp. III-129-III-132.

Santini et al., "Similarity Matching", Proc $2^{nd}$ Asian Conf on Computer Vision, pp. II 544-548, IEEE, 1995.

Rui et al., "A Relevance Feedback Architecture for Content-Based Multimedia Information Retrieval Systems", 1997 IEEE, pp. 82-89.

Walker et al., "Locating Salient Facial Features Using Image Invariants", Proc. $3^{rd}$ IEEE International Conference on Automatic Face and Gesture Recognition, 1998, pp. 242-247.

Mahlmeister et al., "Sample-guided Progressive Image Coding", Proc. Fourteenth Int. Conference on Pattern Recognition, Aug. 16-20, 1998, pp. 1257-1259, vol. 2.

Osberger et al., "Automatic Identification of Perceptually Important Regions in an Image", Proc. Fourteenth Int. Conference on Pattern Recognition, Aug. 16-20, 1998, pp. 701-704, vol. 1.

Buhmann et al., "Dithered Colour Quantisation", Eurographics 98, Sep. 1998, http://opus.fu-bs.de/opus/volltexte/2004/593/pdf/TR-tubs-cq-1998-01.pdf.

Rui et al., "Relevance Feedback: A Power Tool for Interactive Content-Based Image Retrieval", IEEE Transactions on Circuits and Systems for Video Technology, vol. 8, No. 5, Sep. 1998, pp. 644-655.

Gallet et al., "A Model of the Visual Attention to Speed up Image Analysis", Proceedings of the 1998 IEEE International Conference on Image Processing (ICIP-98), Chicago, Illinois, Oct. 4-7, 1998, IEEE Computer Society, 1998, ISBAN-08186-8821-1, vol. 1, pp. 246-250.

Curtis et al., "Metadata—The Key to Content Management Services", $3^{rd}$ IEEE Metadata Conference, Apr. 6-7, 1999.

Stentiford, "Evolution: The Best Possible Search Algorithm?", BT Technology Journal, vol. 18, No. 1, Jan. 2000 (Movie Version).

Rother, "A New Approach for Vanishing Point Detection in Architectural Environments", $11^{TH}$ British Machine Vision Conference, Bristol, UK, Sep. 2000, http://www.bmya.ac.uk/bmvc/2000/papers/p39.pdf.

Raeth et al., "Finding Events Automatically In Continuously Sampled Data Streams Via Anomaly Detection", Proceedings of the IEEE 2000 National Aerospace and Electronics Conference, Naecon, Oct. 10-12, 2000, pp. 580-587.

Sebastian et al., "Recognition of Shapes by Editing Shock Graphs", Proc. ICCV 2001, pp. 755-762.

Stentiford et al., "Automatic Identification of Regions of Interest with Application to the Quantification of DNA Damage in Cells", Human Vision and Electronic Imaging VII, B.E. Rogowitz, T.N. Pappas, Editors, Proc. SPIE vol. 4662, pp. 244-253, San Jose, Jan. 20-26, 2002.

Xu et al., "Video Summarization and Semantics Editing Tools", Storage and Retrieval for Media Databases, Proc. SPIE, vol. 4315, San Jose, Jan. 21-26, 2001.

Stentiford, "An Estimator for Visual Attention Through Competitive Novelty with Application to Image Compression", Picture Coding Symposium 2001, Apr. 25-27, 2001, Seoul, Korea, pp. 101-104, http://www.ee.ucl.ac.uk/-fstentif/PCS2001-pdf.

Stentiford, "An Evolutionary Programming Approach to the Simulation of Visual Attention", Congress on Evolutionary Computation, Seoul, May 27-30, 2001, pp. 851-858.

Cantoni et al., "Vanishing Point Detection: Representation Analysis and New Approaches", 11$^{th}$ Int. Conf. on Image Analysis and Processing, Palermo, Italy, Sep. 26-28, 2001.

Ouerhani et al., "Adaptive Color Image Compression Based on Visual Attention", Proc. 11$^{th}$ Int. Conference on Image Analysis and Processing, Sep. 26-28, 2001, pp. 416-421.

Russ et al., "Smart Realisation: Delivering Content Smartly", J. Inst. BT Engineers, vol. 2, Part 4, pp. 12-17, Oct.-Dec. 2001.

Bradley et al., "JPEG 2000 and Region of Interest Coding", Digital Imaging Computing—Techniques and Applications, Melbourne, Australia, Jan. 21-22, 2002.

Roach et al., "Recent Trends in Video Analysis: A Taxonomy of Video Classification Problems", 6$^{th}$ Iasted Int. Conf. on Internet and Multimedia Systems and Applications, Hawaii, Aug. 12-14, 2002, pp. 348-353.

Bradley et al., "Visual Attention for Region of Interest Coding in JPEG 2000", Journal of Visual Communication and Image Representation, vol. 14, pp. 232-250, 2003.

Stentiford, "An Attention Based Similarity Measure with Application to Content-Based Information Retrieval", Storage and Retrieval for Media Databases 2003, M.M. Yeung, R.W. Leinhart, C-S Li, Editors, Proc SPIE vol. 5021, Jan. 20-24, Santa Clara, 2003.

Stentiford, "The Measurement of the Salience of Targets and Distractors through Competitive Novelty", 26$^{th}$ European Conference on Visual Perception, Paris, Sep. 1-5, 2003, (Poster).

Stentiford, "An Attention Based Similarity Measure for Fingerprint Retrieval", Proc. 4$^{th}$ European Workshop on Image Analysis for Multimedia Interactive Services, pp. 27-30, London, Apr. 9-11, 2003.

Okabe et al., Object Recognition Based on Photometric Alignment Using Ransac, Proceedings of the 2003 IEEE Computer Society Conference on Computer Vision and Pattern Recognition (CVPR'03), vol. 2, pp. 221-228, Jun. 19-20, 2003.

Oyekoya et al., "Exploring Human Eye Behaviour Using a Model of Visual Attention", International Conference on Pattern Recognition 2004, Cambridge, Aug. 23-26, 2004, pp. 945-948.

Stentiford, "A Visual Attention Estimator Applied to Image Subject Enhancement and Colour and Grey Level Compression", International Conference on Pattern Recognition 2004, Cambridge, Aug. 23-26, 2004, pp. 638-641.

Rasmussen, "Texture-Based Vanishing Point Voting for Road Shape Estimation", British Machine Vision Conference, Kingston, UK, Sep. 2004, http://www.bmva.ac.uk/bmvc/2004/papers/paper_261.pdf.

Finlayson et al., "Illuminant and Device Invariant Colour Using Histogram Equalisation", Pattern Recognition, vol. 38, No. 2 (Feb. 2005), pp. 179-190.

Stentiford, "Attention Based Facial Symmetry Detection", International Conference on Advances in Pattern Recognition, Bath, UK, Aug. 22-25, 2005.

Stentiford, "Attention Based Symmetry Detection in Colour Images", IEEE International Workshop on Multimedia Signal Processing, Shanghai, China, Oct. 30-Nov. 2, 2005.

Wang et al., "Efficient Method for Multiscale Small Target Detection from a Natural Scene", 1996 Society of Photo-Optical Instrumentation Engineers, Mar. 1996, pp. 761-768.

Rohwer et al., "The Theoretical and Experimental Status of the n-Tuple Classifier", Neural Networks, vol. 11, No. 1, pp. 1-14, 1998.

Brown, A Survey of Image Registration Techniques, ACM Computing Surveys, vol. 24, No. 4, Dec. 1992, pp. 325-376.

Zhao et al., "Face Recognition: A Literature Survey", CVLK Technical Report, University of Maryland, Oct. 2000, ftp://ftp.cfar.umd.edu/TRs/CVL-Reports-2000/TR4167-zhao.ps.qz.

Stentiford et al., "An Evolutionary Approach to the Concept of Randomness", The Computer Journal, pp. 148-151, Mar. 1972.

* cited by examiner

SEARCHING IMAGES

This application is the US national phase of international application PCT/GB2003/005096 filed 24 Nov. 2003 which designated the U.S. and claims benefit of GB 0229625.9, dated 19 Dec. 2002, the entire content of which is hereby incorporated by reference.

BACKGROUND

1. Technical Field

This application involves retrieval of stored images with metadata.

2. Related Art

The wide availability of digital sensor technology together with the falling price of storage devices has spurred an exponential growth in the volume of image material being captured for a range of applications. Digital image collections are rapidly increasing in size and include basic home photos, image based catalogues, trade marks, fingerprints, mugshots, medical images, digital museums, and many art and scientific collections. It is not surprising that a great deal of research effort over the last five years has been directed at developing efficient methods for browsing, searching and retrieving images [1,2].

Content-based image retrieval requires that visual material be annotated in such a way that users can retrieve the images they want efficiently and effortlessly. Current systems rely heavily upon textual tagging and measures (eg colour histograms) that do not reflect the image semantics. This means that users must be very conversant with the image features being employed by the retrieval system in order to obtain sensible results and are forced to use potentially slow and unnatural interfaces when dealing with large image databases. Both these barriers not only prevent the user from exploring the image set with high recall and precision rates, but the process is slow and places a great burden on the user.

Early retrieval systems made use of textual annotation [3] but these approaches do not always suit retrieval from large databases because of the cost of the manual labour involved and the inconsistent descriptions, which by their nature are heavily dependent upon the individual subjective interpretation placed upon the material by the human annotator. To combat these problems techniques have been developed for image indexing that are based on their visual content rather than highly variable linguistic descriptions.

It is the job of an image retrieval system to produce images that a user wants. In response to a user's query the system must offer images that are similar in some user-defined sense. This goal is met by selecting features thought to be important in human visual perception and using them to measure relevance to the query. Colour, texture, local shape and layout in a variety of forms are the most widely used features in image retrieval [4,5,6,7,8,9,10]. One of the first commercial image search engines was QBIC [4] which executes user queries against a database of pre-extracted features. VisualSEEk [7] and SaFe [11] determine similarity by measuring image regions using both colour parameters and spatial relationships and obtain better performance than histogramming methods that use colour information alone. NeTra [8] also relies upon image segmentation to carry out region-based searches that allow the user to select example regions and lay emphasis on image attributes to focus the search. Region-based querying is also favoured in Blobworld [6] where global histograms are shown to perform comparatively poorly on images containing distinctive objects. Similar conclusions were obtained in comparisons with the SIMPLIcity system [30]. The Photobook system [5] endeavors to use compressed representations that preserve essential similarities and are "perceptually complete". Methods for measuring appearance, shape and texture are presented for image database search, but the authors point out that multiple labels can be justifiably assigned to overlapping image regions using varied notions of similarity.

Analytical segmentation techniques are sometimes seen as a way of decomposing images into regions of interest and semantically useful structures [21-23,45]. However, object segmentation for broad domains of general images is difficult, and a weaker form of segmentation that identifies salient point sets may be more fruitful [1].

Relevance feedback is often proposed as a technique for overcoming many of the problems faced by fully automatic systems by allowing the user to interact with the computer to improve retrieval performance [31,43]. In Quicklook [41] and ImageRover [42] items identified by the user as relevant are used to adjust the weights assigned to the similarity function to obtain better search performance. More information is provided to the systems by the users who have to make decisions in terms specified by the machine. MetaSeek maintains a performance database of four different online image search engines and directs new queries to the best performing engine for that task [40]. PicHunter [12] has implemented a probabilistic relevance feedback mechanism that predicts the target image based upon the content of the images already selected by the user during the search. This reduces the burden on unskilled users to set quantitative pictorial search parameters or to select images that come closest to meeting their goals. Most notably the combined use of hidden semantic links between images improved the system performance for target image searching. However, the relevance feedback approach requires the user to reformulate his visual interests in ways that he frequently does not understand.

Region-based approaches are being pursued with some success using a range of techniques. The SIMPLIcity system [30] defines an integrated region matching process which weights regions with 'significance credit' in accordance with an estimate of their importance to the matching process. This estimate is related to the size of the region being matched and whether it is located in the centre of the image and will tend to emphasise neighbourhoods that satisfy these criteria. Good image discrimination is obtained with features derived from salient colour boundaries using multimodal neighbourhood signatures [13-15,36]. Measures of colour coherence [16,29] within small neighbourhoods are employed to incorporate some spatial information when comparing images. These methods are being deployed in the $5^{th}$ Framework project ARTISTE [17, 18, 20] aimed at automating the indexing and retrieval of the multimedia assets of European museums and Galleries. The MAVIS-2 project [19] uses quad trees and a simple grid to obtain spatial matching between image regions.

Much of the work in this field is guided by the need to implement perceptually based systems that emulate human vision and make the same similarity judgements as people. Texture and colour features together with rules for their use have been defined on the basis of subjective testing and applied to retrieval problems [24]. At the same time research into computational perception is being applied to problems in image search [25,26]. Models of human visual attention are used to generate image saliency maps that identify important or anomalous objects in visual scenes [25,44]. Strategies for directing attention using fixed colour and corner measurements are devised to speed the search for target images [26]. Although these methods achieve a great deal of success on many types of image the pre-defined feature measures and rules for applying them will preclude good search solutions in the general case.

The tracking of eye movements has been employed as a pointer and a replacement for a mouse [48], to vary the screen scrolling speed [47] and to assist disabled users [46]. However, this work has concentrated upon replacing and extending existing computer interface mechanisms rather than creating a new form of interaction. Indeed the imprecise nature of saccades and fixation points has prevented these approaches from yielding benefits over conventional human interfaces.

Notions of pre-attentive vision [25,32-34] and visual similarity are very closely related. Both aspects of human vision are relevant to content-based image retrieval; attention mechanisms tell us what is eye-catching and important within an image, and visual similarity tells us what parts of an image match a different image.

A more recent development has yielded a powerful similarity measure [35]. In this case the structure of a region in one image is being compared with random parts in a second image while seeking a match. This time if a match is found the score is increased, and a series of randomly generated features are applied to the same location in the second image that obtained the first match. A high scoring region in the second image is only reused while it continues to yield matches from randomly generated features and increases the similarity score. The conjecture that a region in the second image that shares a large number of different features with a region in the first image is perceptually similar is reasonable and appears to be the case in practice [35]. The measure has been tested on trademark images and fingerprints and within certain limits shown to be tolerant of translation, rotation, scale change, blur, additive noise and distortion. This approach does not make use of a pre-defined distance metric plus feature space in which feature values are extracted from a query image and used to match those from database images, but instead generates features on a trial and error basis during the calculation of the similarity measure. This has the significant advantage that features that determine similarity can match whatever image property is important in a particular region whether it be a shape, a texture, a colour or a combination of all three. It means that effort is expended searching for the best feature for the region rather than expecting that a fixed feature set will perform optimally over the whole area of an image and over every image in the database. There are no necessary constraints on the pixel configurations used as features apart from the colour space and the size of the regions which is dependent in turn upon the definition of the original images.

More formally, in this method (full details of which are given in our International patent application WO 03/081523), a first image (or other pattern) is represented by a first ordered set of elements A each having a value and a second pattern is represented by a second such set. A comparison of the two involves performing, for each of a plurality of elements x of the first ordered set the steps of selecting from the first ordered set a plurality of elements x' in the vicinity of the element x under consideration, selecting an element y of the second ordered set and comparing the elements x' of the first ordered set with elements y of the second ordered set (each of which has the same position relative to the selected element y' of the second ordered set as a respective one x of the selected plurality of elements of the first ordered set has relative to the element x under consideration). The comparison itself comprises comparing the value of each of the selected plurality of elements x' of the first set with the value of the correspondingly positioned element y' of the like plurality of elements of the second set in accordance with a predetermined match criterion to produce a decision that the plurality of elements of the first ordered set matches the plurality of elements of the second ordered set. The comparison is them repeated with a fresh selection of the plurality of elements x' of the first set and/or a fresh selection of an element y of the second ordered set generating a similarity measure V as a function of the number of matches. Preferably, following a comparison resulting in a match decision, the next comparison is performed with a fresh selection of the plurality of elements x' of the first set and the same selection of an element y of the second set.

SUMMARY

According to the present exemplary embodiment there is provided a method of retrieval of stored images stored with metadata for at least some of the stored images, the metadata comprising at least one entry specifying
(a) a part of the respective image;
(b) another stored image; and
(c) a measure of the degree of similarity between the specified part and the specified other stored image; the method comprising
i. displaying one or more images;
ii. receiving input from a user indicative of part of the displayed images;
iii. determining measures of interest for each of a plurality of non-displayed stored images specified by the metadata for the displayed image(s), as a function of the similarity measure(s) and the relationship between the user input and the part specified;
iv. selecting from those non-displayed stored images, on the basis of the determined measures, further images for display.

Other aspects of the exemplary embodiments are set out in the other claims.

BRIEF DESCRIPTION OF THE DRAWINGS

Some exemplary embodiments of the invention will now be described, by way of example, with reference to the accompanying drawings, in which.

DETAILED DESCRIPTION OF EXEMPLARY EMBODIMENTS

Figure 1:
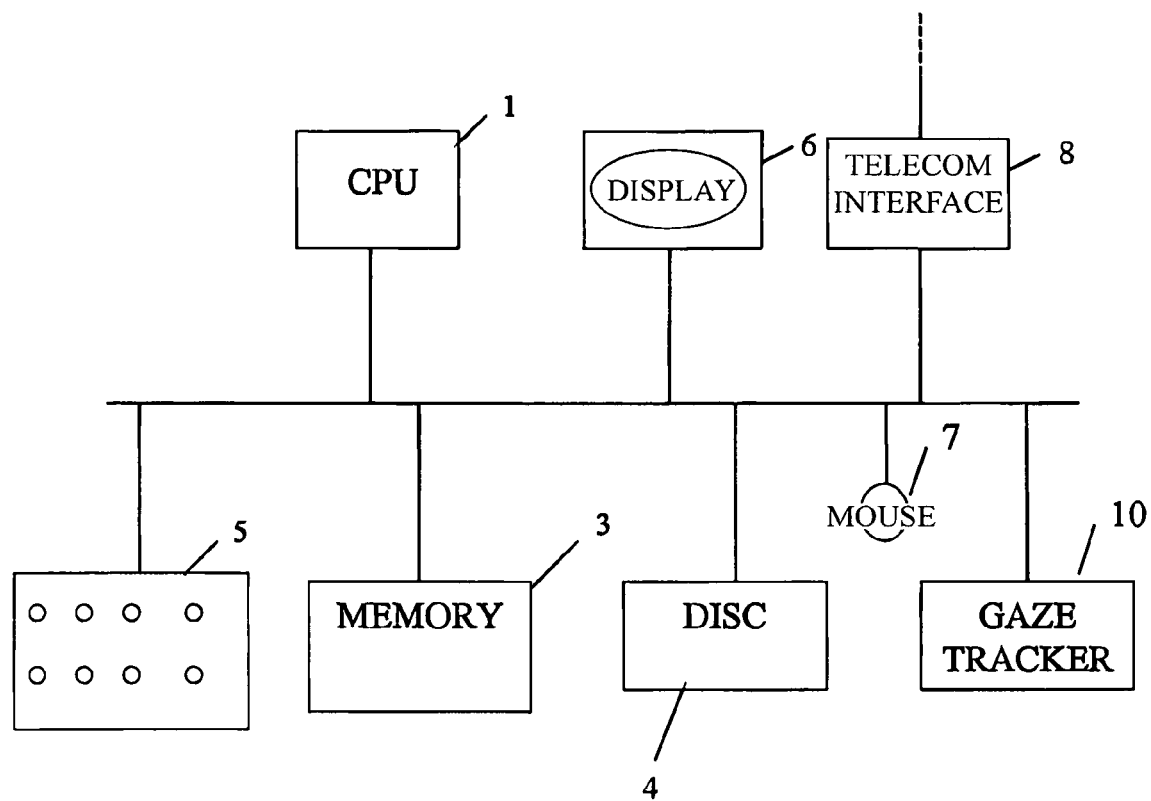
FIG. 1 is a block diagram of an apparatus according to one embodiment of the invention.

The apparatus shown in FIG. 1 comprises a processor 1, a memory 3, disc store 4, keyboard 5, display 6, mouse 7, and telecommunications interface 8 such as might be found in a conventional desktop computer. In addition, the apparatus includes a gaze tracker 10, which is a system that observes, by means of a camera, the eye of a user and generates data indicating which part of the display 6 the user is looking at. One gaze tracker that might be used is the Eyegaze system, available from LC Technologies Inc., Fairfax, Va., U.S.A. As well as the usual operating system software, the disc store 4 contains a computer program which serves to implement the method now to be described whereby the user is enabled to search a database of images. The database could be stored in the disc store 4, or it could be stored on a remote server accessible via the telecommunications interface 8.

The first method to be described, suitable for a small database, assumes that for each image stored in the database, the database already also contains one or more items of metadata each of which identifies a point or region of the image in question, another image, and a score indicating a degree of similarity between that point or region and the other image, For example a metadata item for an image frog.bmp might read:

113,42; toad.bmp;61 meaning that the image frog.bmp has, at x, y coordinates 113, 42, a feature which shows a similarity score of 61 with the image toad.bmp. Further such items might indicate similarities of some other location within frog.bmp to toad.bmp, or similarities between frog.bmp and further images in the database.

Figure 2:
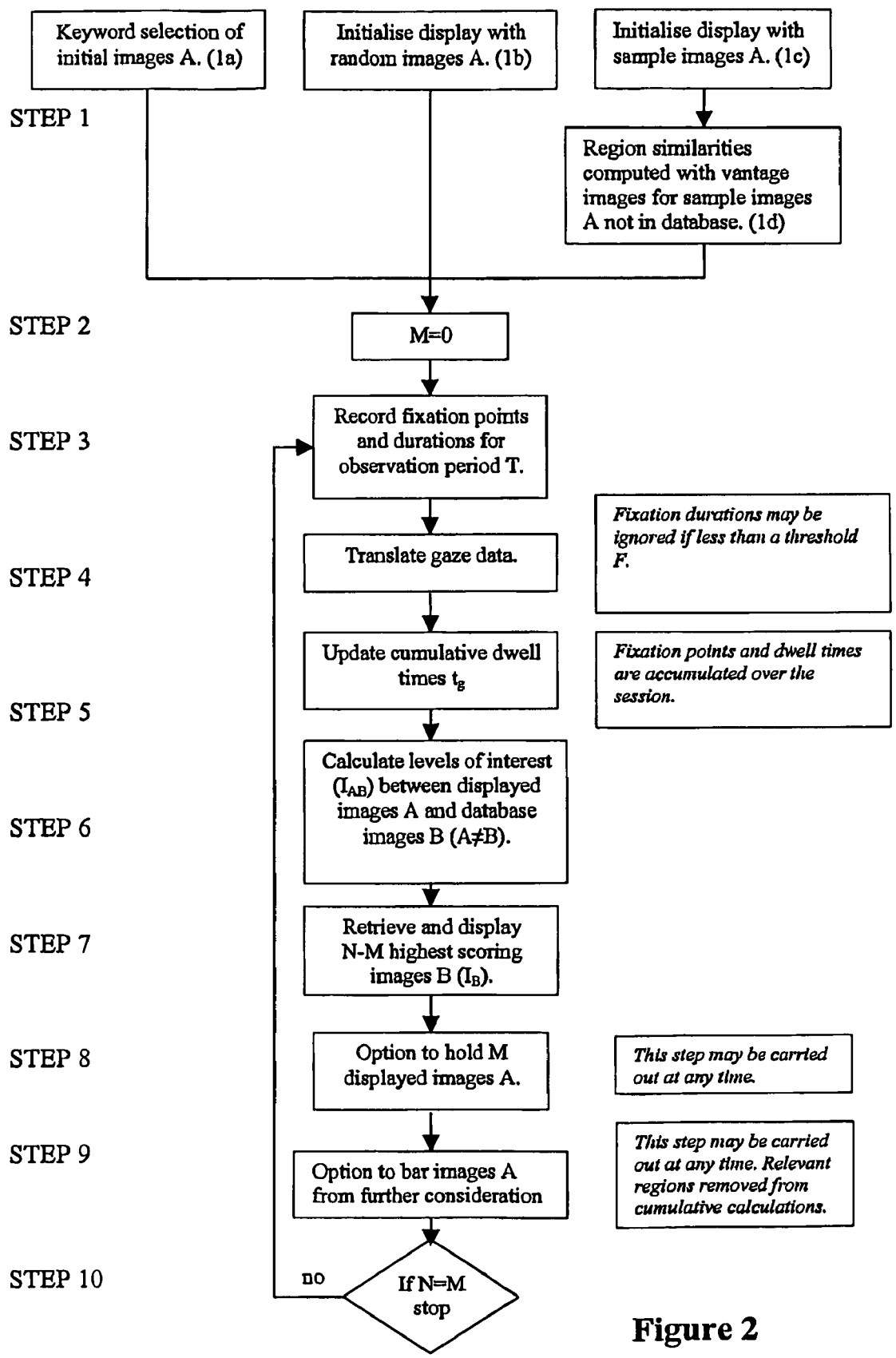
FIG. 2 is a flowchart showing how that apparatus functions.

The manner in which such metadata can be created will be described later; first, we will describe a retrieval process, with reference to the flowchart of FIG. 2.

The retrieval process begins at Step 1 with the display of some initial images from the database. These could be chosen (1a) by some conventional method (such as keywords) or (1b) at random. At Step 2a "held image" counter is set to zero and, immediately the images are displayed, a timer defining a duration T is started (Step 3). During this time the user looks at the image and the system notes which of the images, and more particularly which parts of the images, the user finds to be of interest. This is done using the gaze tracker 10 which tracks the user's eye movement and records the position and duration of fixations (i.e., when the eye is not moving significantly). Its output takes the form of a sequence of reports each consisting of screen coordinates $x_s$, $y_s$ and the duration t of fixation at this point.

The value of T may be quite small allowing only a few saccades to take place during each iteration. This will mean that the displayed image set A will be updated frequently, but the content may not change dramatically at each iteration. On the other hand a large value of T may lead to most of the displayed images being replaced.

In Step 4, these screen coordinates are translated into an identifier for the image looked at, and x, y coordinates within that image. Also (Step 5) if there are multiple reports with the same x, y the durations t for these are added so that a single total duration $t_g$ is available for each x, y reported. Some users may suffer from short eye movements that do not provide useful information and so a threshold F may be applied so that any report with $t \leq F$ is discarded.

The next stage is to use this information in combination with metadata for the displayed images in order to identity images in the database which have similarities with those parts of the displayed images that the user has shown interest in.

Thus at Step 6, for a displayed image a and an image b in the database, a level of interest $I_{ab}$ is calculated. For this purpose the user is considered to have been looking at a particular point if the reported position of his gaze is at, or within, some region centred on, the point on question. The size of this region will depend on the size of the user's fovea centralis and his viewing distance from the screen: this may if desired be calibrated, though satisfactory results can be obtained if a fixed size is assumed.

For a displayed image a and an image b in the database, a level of interest $I_{ab}$ is calculated as follows:

$$I_{ab} = \sum_{g=1}^{G} \sum_{i=1}^{I} t_g . S_{abi} . \delta(x_g, y_g, x_i, y_i)$$

where $t_g$ is the total fixation duration at position $x_g$, $y_g$ (g= 1, . . . , G) and G is the number of total durations. $S_{abi}$ is the score contained in the metadata for image a indicating a similarity between point $x_i$, $y_i$ in image a and another image b, and there are I items of metadata in respect of image a and specifying the same image b. Naturally, if, for any pair a, b, there is no metadata entry for $S_{abi}$, $S_{abi}$ is deemed to be zero. And $\delta(x_g, y_g, x_i, y_i)$ is 1 if $x_g$, $y_g$ is within the permitted region centred on $x_i$, $y_i$ and zero otherwise. For a circular area, $\delta=1$ if and only if $(x_g - x_i)^2 + (y_g - y_i)^2 < r^2$ where r is assumed effective radius of the fixation area. Obviously $I_{ab}$ exists only for those images b for which values of $S_{abi}$ are present in the metadata for one or more of the displayed images a.

The next (Step 7) is to obtain a score $I_b$ for such images, namely $I_b = \Sigma I_{ab}$ summed over all the displayed images a.

Also in Step 7, the images with the highest values of $I_b$ are retrieved from the database and displayed. The number of images that are displayed may be fixed, or, as shown may depend on the number of images already held (see below).

Thus, if the number of images held is M and the number of images that are allowed to be displayed is N (assumed fixed) then the N-M highest scoring images will be chosen. The display is then updated by removing all the existing displayed images (other than held ones) and displaying the chosen images B instead. The images now displayed then become the new images A for a further iteration.

At Step 8 the user is given the option to hold any or all (thereby stopping the search) of the images currently displayed and prevent them from being overwritten in subsequent displays. The user is also free to release images previously held. The hold and release operations may be performed by a mouse click, for example. The value of M is correspondingly updated.

In Step 9 the user is able to bar displayed images from being subsequently included in set B and not being considered in the search from that point. It is common for image databases to contain many very similar images, some even being cropped versions of each other, and although these clusters may be near to a user's requirements, they should not be allowed to block a search from seeking better material. This operation may be carried out by means of a mouse click, for example.

The user is able to halt the search in Step 10 simply by holding all the images on the screen however, other mechanisms for stopping the search may be employed.

It should be noted that the user is able to invoke Steps 8 or 9 at any time in the process after Step 2. This could be a mouse click or a screen touch and may be carried out at the same time as continuing to gaze at the displayed images.

The invention does not presuppose the use of any particular method for generating the metadata for the images in the database. Indeed, it could in principle be generated manually. In general this will be practicable only for very small databases, though in some circumstances it may be desirable to generate manual entries in addition to automatically generated metadata.

We prefer to use the method described in our earlier patent application referred to above.

For a small database, it is possible to perform comparisons for every possible pair of images in the database, but for larger databases this is not practicable. For example if a database has 10,000 images this would require $10^8$ comparisons.

Thus, in an enhanced version, the images in the database are clustered; that is, certain images are designated as vantage images, and each cluster consists of a vantage image and a number of other images. It is assumed that this clustering is performed manually by the person loading images into the database. For example if he is to load a number of images of horses, he might choose one representative image as the vantage image and mark others as belonging to the cluster. Note that an image may if desired belong to more than one cluster.

The process of generating metadata is then facilitated:
(a) Each image in a cluster is scored against every other image in its own cluster (or clusters).
(b) Each vantage image is scored against every other vantage image.

The possibility however of other links being also generated is not excluded. In particular, once a database has been initially set up in this way one could if desired make farther comparisons between images, possibly at random, to generate more metadata, so that as time goes on more and more links between images are established.

In the above-described retrieval method it was assumed that the initial images were retrieved at random or by some conventional retrieval method. A better option is to allow the user to input his own images to start the search (Step 1c). In this case, before retrieval can commence it is necessary to set up metadata for these external starting images. This is done by running the set-up method to compare (Step 1d) each of these starting images with all the images in the database (or, in a large database all the vantage images). In this way the starting images (temporarily at least) effectively become part of the database and the method then proceeds in the manner previously described.

The "level of interest" is defined above as being formed from the products of the durations $t_g$ and the scores S; however other monotonic functions may be used. The set-up method (and hence also the retrieval method) described earlier assumes that a metadata entry refers to a particular point within the image. Alternatively, the scoring method might be modified to perform some clustering of points so that an item of metadata, instead of stating that a point (x, y) in A has a certain similarity to B, states that a region of specified size and shape, at (x, y) in A, has a certain similarity to B. One method of doing this, which assumes a square area of fixed size $2\Delta+1 \times 2\Delta+1$, is as follows. Starting with the point scores S(x, y):

for each point, add the scores for all pixels with such an area centred on x, y to produce an area score $$S^1(x, y) = \sum_{u=x-\Delta}^{x+\Delta} \sum_{v=y-\Delta}^{y+\Delta} S(u, v)$$

select one or more areas with the largest $S^1$.

Then $S^1$ are stored in the metadata instead of S. The retrieval method proceeds as before except that (apart from the use of $S^1$ rather than S) the function δ is redefined as being 1 whenever the gaze point $x_g$ $y_g$ falls within the square area or within a distance r of its boundary.

If areas of variable size and/or shape are to be permitted then naturally the metadata would include a definition of the size and shape and the function δ modified accordingly.

In the interests of avoiding delays, during Steps 2 to 6, all 'other' images referenced by the metadata of the displayed image could be retrieved from the database and cached locally.

Note that the use of a gaze tracker is not essential; user input by means of a pointing device such as a mouse could be used instead, though the gaze tracker option is considered to be much easier to use.

During the process of image retrieval users can traverse a sequence of images that are selected by the user from those presented by the computer. The machine endeavours to predict the most relevant groups of images and the user selects on the basis of recognised associations with a real or imagined target image. The retrieval will be successful if the images presented to the user are on the basis of the same associations that the user also recognises. Such associations might depend upon semantic or visual factors which can take virtually unlimited forms often dependent upon the individual user's previous experience and interests. This system makes provision for the incorporation of semantic links between images derived from existing or manually captured textual metadata.

The process of determining the similarity score between two images necessarily identifies a correspondence between regions that give rise to large contributions towards the overall image similarity. A set of links between image locations together with values of their strengths is then available to a subsequent search through images that are linked in this way. There may be several such links between regions in pairs of images, and further multiple links to regions in other images in the database. This network of associations is more general than those used in other content-based image retrieval systems which commonly impose a tree structure on the data, and cluster images on the basis of symmetrical distance measures between images [27,37]. Such restrictions prevent associations between images being offered to users that are not already present in the fixed hierarchy of clusters. It should be noted that the links in this system are not symmetric as there is no necessary reason for a region that is linked to a second to be linked in the reverse direction. The region in the second image may be more similar to a different region in the first image. The triangle inequality is not valid as it is quite possible for image A to be very similar to B, and B to C, but A can be very different from C. Other approaches preclude solutions by imposing metrics that are symmetric and/or satisfy the triangle inequality [28].

This new approach to content-based retrieval will allow a large number of pre-computed similarity associations between regions within different images to be incorporated into a novel image retrieval system. In large databases it will not be possible to compare all images with each other so clusters and vantage images [37,38,39] will be employed to minimise computational demands. However, as users traverse the database fresh links will be continually generated and stored that may be used for subsequent searches and reduce the reliance upon vantage images. The architecture will be capable of incorporating extra links derived from semantic information [12] that already exists or which can be captured manually.

It is not natural to use a keyboard or a mouse when carrying out purely visual tasks and presents a barrier to many users. Eyetracking technology has now reached a level of performance that can be considered as an interface for image retrieval that is intuitive and rapid. If it is assumed that users fixate on image regions that attract their interest, this information may be used to provide a series of similar images that will converge upon the target or an image that meets the users' demands. Of course a mouse could be used for the same task, but has less potential for extremely rapid and intuitive access. Users would be free to browse in an open-ended manner or to seek a target image by just gazing at images and gaining impressions, but in so doing driving the search by means of saccades and fixation points. Similarity links between image regions together with corresponding strength values would provide the necessary framework for such a system which would be the first of its kind in the world.

REFERENCES

[1] A. W. M. Smeulders, M. Worring, S. Santini, A. Gupta and R. Jain, "Content-Based Image Retrieval at the End of the Early Years," IEEE Trans PAMI, Vol 22, No 12, pp 1349-1379, December 2000.

[2] Y. Rui, T. S. Huang and S-F Chang, "Image Retrieval: Current Techniques, Promising Directions and Open Issues,"

[3] S-K. Chang and A. Hsu, "Image Information Systems: Where Do We Go from Here?" IEEE Trans on Data and Knowledge Eng., Vol 4, No 5, pp 431-442, October 1992.

[4] M. Flickner, H. Sawhney, W. Niblack, J. Ashley, Q. Huang, B. Dom, M. Gorkani, J. Hafner, D. Lee, D. Petkovic, D. Steele, and P. Yanker, "Query by Image and Video Content: The QBIC System," IEEE Computer, 1995.

[5] A. Pentland, R. W. Pickard, and S. Sclaroff, "Photobook: Content-Based Manipulation of Image Databases," SPIE Storage and Retrieval of Images and Video Databases II, No 2185, February 6-10, San Jose, 1994.

[6] C. Carson, S. Belongie, H. Greenspan, and J. Malik, "Blobworld: Image Segmentation using Expectation-Maximisation and its Application to Image Querying," IEEE Trans. Pattern Analysis and Machine Intelligence, Vol 24, No 8, pp 1026-1038, August 2002.

[7] J. R. Smith and S-F. Chang, "VisualSEEk: a fully automated Content-Based Image Query System," Proc. ACM Int. Conf. Multimedia, pp 87-98, Boston Mass., November 1996.

[8] W-Y. Ma and B. S. Manjunath, "NeTra: a Toolbox for Navigating Large Image Databases," Multimedia Systems, Vol 7, pp 184-198, 1999.

[9] A. Gupta and R. Jain, "Visual Information Retrieval," Communications of the ACM, Vol 40, No 5, pp 70-79, May 1997.

[10] J. Dowe, "Content Based Retrieval in Multimedia Imaging," Proc SPIE Conf. Storage and Retrieval for Image and Video Databases, 1993.

[11] J. R. Smith and S-F. Chang, "Integrated Spatial and Feature Image Query," Multimedia Systems, Vol 7, No 2, pp 129-140, 1999.

[12] I. J. Cox, M. L. Miller, T. P. Minka, and T. V. Papathomas, "The Baysian Image Retrieval System, PicHunter: Theory, implementation, and Psychophysical Experiments," IEEE Trans. Image Processing, Vol 9, No 1, pp 20-37, 2000.

[13] J. Matas, D. Koubaroulis, and J. Kittler, "Colour Image Retrieval and Object Recognition using the Multimodal Neighbourhood Signature," Proc. ECCV, LNCS, Vol 1842, pp 48-64, Berlin, June 2000.

[14] D. Koubaroulis, J. Matas, and J. Kittler, "Evaluating Colour-Based Object Recognition Algorithms Using the SOIL-47 Database," $5^{th}$ Asian Conf. on Computer Vision, Melbourne, Australia, 23-25 Jan. 2002.

[15] M Westmacott, P. Lewis, and Kirk Martinez, "Using Colour Pair Patches for Image Retrieval," Proc. $1^{st}$ European Conf. on Colour in Graphics, Image and Vision, pp 245-247, April 2002.

[16] G. Pass, R. Zabih, and J. Miller, "Comparing Images using Color Coherence Vectors," $4^{th}$ ACM Conf. on Multimedia, Boston Mass., November 1996.

[17] Website for "artisteweb" dot "org"

[18] S. Chan, K. Martinez, P. Lewis, C. Lahanier, and J. Stevenson, "Handling Sub-Image Queries in Content-Based Retrieval of High Resolution Art Images," International Cultural Heritage Informatics Meeting 2, pp 157-163, September 2001.

[19] D. Dupplaw, P. Lewis, and M. Dobie, "Spatial Colour Matching for Content Based Retrieval and Navigation," Challenge of Image Retrieval, 99, Newcastle, February 1999.

[20] P. Allen, M. Boniface, P. Lewis, and K. Martinez, "Interoperability between Multimedia Collections for Content and Metadata-Based Searching," Proc. WWW Conf., May 2002.

[21] T. Louchnikova and S. Marchand-Maillet, "Flexible Image Decomposition for Multimedia Indexing and Retrieval," Proc SPIE Internet Imaging III, Vol 4673, 2002.

[22] J. Fan, M. Body, X. Zhu, M-S. Hacid, and E. El-Kwae, "Seeded Image Segmentation for Content-Based Image Retrieval Application," Proc SPIE, Storage and Retrieval for Media Databases, 2002.

[23] J. Puzicha, T. Hofmann, and J. M. Buhmann, "Histogram Clustering for Unsupervised Segmentation and Image Retrieval," Pattern Recognition Letters, 20, pp 899-909, 1999.

[24] A. Mojsilovic, J. Kovacevic, J. Hu, R. J. Safranek, and S. K. Ganapathy, "Matching and Retrieval Based on the Vocabulary and Grammar of Color Patterns," IEEE Trans on Image Processing, Vol 9, No 1, January 2000.

[25] E. Niebur, L. Itti, and Christof Koch, "Controlling the Focus of Visual Selective Attention," in Models of Neural Networks IV, Van Hemmen, Cowan & Domany eds., Springer Verlag, NY, pp 247-276, 2002.

[26] H. D. Tagare, K Toyama, and J. G. Wang, "A Maximum-Likelihood Strategy for Directing Attention during Visual Search," IEEE Trans. on Pattern Analysis and Machine Intelligence, Vol 23, No 5, May 2001.

[27] S. Berretti, A. D. Bimbo, and E. Vicario, "Efficient Matching and Indexing of Graph Models in Content-Based Retrieval," IEEE Trans on Pattern Analysis and Machine Intelligence, Vol 23, No 10, October 2001.

[2S] S. Santini and R. Jain, "Similarity Measures,", IEEE Trans on Pattern Analysis and Machine Intelligence, Vol 21, No 9, September 1999.

[29] A. Vailaya, M. A. T. Figueiredo, A. K. Jain, and H-J. Zhang, "Image Classification for Content-Based Indexing," IEEE Trans on Image Processing, Vol 10, No 1, pp 117-130, January 2001.

[30] J. Z. Wang, J, Li, and G. Wiederhold, "SIMPLIcity: Semantics-Sensitive Integrated Matching for Picture Libraries," IEEE Trans on Pattern Analysis and Machine Intelligence, Vol 23, No 9, pp 947-963, September 2001.

[31] Y. Rui, T. S. Huang, M. Ortega, and S. Mehrotra, "Relevance Feedback: A Power Tool for Interactive Content-Based Image Retrieval," IEEE Trans on Circuits and Video Technology, pp 1-13, 1998.

[32] F. W. M. Stentiford, "An evolutionary programming approach to the simulation of visual attention," Congress on Evolutionary Computation, Seoul, May 27-30, 2001.

[33] F. W. M. Stentiford, "An estimator for visual attention through competitive novelty with application to image compression," Picture Coding Symposium, Seoul, 24-27 Apr., 2001.

[34] F. W. M. Stentiford, N. Morley, and A. Curnow, "Automatic identification of regions of interest with application to the quantification of DNA damage in cells," Proc SPIE, Vol 4662, San Jose, 20-26 Jan., 2002.

[35] F. W. M. Stentiford, "An attention based similarity measure with application to content based information retrieval," accepted to the Storage and Retrieval for Media Databases conference at SPIE Electronic Imaging 2003, 20-24 January, Santa Clara.

[36] TriTex Project IST-1999-20500, "Automated 3D Texture Content Management in Large Scale Data Sets," http://www.connect.slb.comn/Docs/ofs/ofs_research_public/ofsr_public_images/locations/ssr/stavanger/TriTex/

[37] J. Landre and F. Truchetet, "A hierarchical architecture for content-based image retrieval of paleontology images," Proc SPIE, Vol 4676, San Jose, 20-26 Jan., 2002.

[38] P. N. Yianilos, "Data structures and algorithms for nearest neighbor search in general metric spaces," Proc. $4^{th}$ ACM-SIAM Symposium on Discrete Algorithms, pp 311-321, 1993.

[39] J. Vleugels and R. Veltkamp, "Efficient image retrieval through vantage objects", Pattern Recognition, Vol 35, pp 69-80, 2002.

[40] A. B. Benitez, M. Beigi, and S-F. Chang, "Using relevance feedback in content-based image metasearch," IEEE Internet Computing, pp 59-69, July/August 1998.

[41] G. Ciocca and R. Schettini, "A multimedia search engine with relevance feedback," *Proc SPIE*, Vol 4672, San Jose, 20-26 Jan., 2002.

[42] L. Taycher, M. La Cascia, and S. Sclaroff, "Image digestion and relevance feedback in the ImageRover WWW search engine," Proc. $2^{nd}$ Int. Conf. on Visual Information Systems, San Diego, pp 85-94, December 1997.

[43] J. Vendrig, M. Worring, and A. W. M. Smeulders, "Filter image browsing: exploiting interaction in image retrieval," Proc. $3^{rd}$ Int. Conf. VISUAL'99, June 1999.

[44] R. B. Fisher and A. MacKirdy, "Integrated iconic and structured matching," Proc $5^{th}$ European Conf. on Computer Vision, Vol II, pp 687-698, Frieburg, June 1998.

[45] P. R. Hill, C. N. Canagarajah, and D. R. Bull, "Texture gradient based watershed segmentation," ICASSP, Orlando, May 13-17, pp 3381-3384, 2002.

[46] F. Corno, L. Farinetti and I. Signorile, "A cost effective solution for eye-gaze assistive technology," 2002 IEEE Int Conf. on Multimedia and Expo, August 26-29, Lausanne, 2002.

[47] T. Numajiri, A. Nakamura, and Y. Kuno, "Speed browser controlled by eye movements," 2002 IEEE Int Conf. on Multimedia and Expo, August 26-29, Lausanne, 2002.

[48] J. P. Hansen, A. W. Anderson, and P. Roed, "Eye gaze control of multimedia systems," Symbiosis of Human and Artifact (Y. Anzai, K. Ogawa, and H. Mori (eds), Vol 20A, Elsevier Science, pp 3742, 1995.

The invention claimed is:

1. A computer-implemented method of retrieval of stored images stored with metadata for at least some of the stored images, the stored metadata comprising at least one entry specifying (a) a part of the respective image, (b) another stored image, and (c) a measure of the degree of similarity between the specified part and the specified other stored image, the method comprising using a computer to perform the steps of:
   i. displaying one or more images;
   ii. receiving input from a user specifying a part of at least one of the displayed images;
   iii. determining measures of interest for each of a plurality of non-displayed stored images specified by said metadata for the displayed image(s), as a function of (a) said stored measures of the degree of similarity and (b) the relationship between the user input and the respectively corresponding part specified;
   iv. selecting from those non-displayed stored images, on the basis of the determined measures of interest, further images for display.

2. A method according to claim 1 in which the receiving of input from a user is performed by means operable to observe movement of the user's eye.

3. A method according to claim 2 in which the user input identifies image locations and associated attention durations, and each measure of interest is the sum of individual measures for each identified location that is within a predetermined distance of a specified part, each said individual measure being a function of the attention duration that is associated with the identified location and the similarity measure that is associated with the specified part.

4. A method according to claim 3 in which each individual measure is the product of the duration and the similarity measure.

5. A method according to claim 1 in which the specified parts of the images are points within the images.

6. A method according to claim 1 in which the specified parts of the images are regions thereof.

7. A method according to claim 1 in which steps (ii) to (iv) are repeated at least once.

8. A method according to claim 1 further including the initial computer-implemented steps of:
   receiving one or more external images;
   generating said metadata in respect of the external image(s); and
   displaying the external image(s).

9. A computer-implemented method of retrieval of stored digital images from a database comprising use of a computer to perform the steps of:
   i. displaying one or more digital images from the database;
   ii. receiving input from a user indicative of part of the displayed image(s);
   iii. determining measures of interest for each of a plurality of non-displayed stored images from the database, said images specified by metadata for the displayed image(s); and
   iv. selecting from those non-displayed stored images, on the basis of the determined measures, further images for display;
   wherein:
   the user input is received by gaze-tracking means operable to observe movement of the user's eye and to output signals ($x_g$, $y_g$) indicating positions of fixation of the eye within the displayed images(s);
   the stored images are stored with metadata comprising at least one entry specifying (a) a part of the respective image, (b) another stored image, and (c) a measure ($S_{abi}$) of the degree of similarity between the specified part and the specified other stored image; and
   each said measure of interest ($I_{ab}$) for a non-displayed stored image is automatically determined as a function of the measures of the degree of similarity ($S_{abi}$) in respect to parts of the displayed image indicated by the signals ($x_g$, $y_g$) from the gaze tracking means.

10. A method according to claim 9 in which the gaze tracking means also identifies associated durations of fixation ($t_g$), and each measure of interest ($I_{ab}$) is a function also of the durations of fixation associated with the indicated parts of the image.

11. A method according to claim 10 in which each measure of interest ($I_{ab}$) is the sum of individual measures for each position of fixation that is within a predetermined distance (r) of a specified part, each said individual measure being a function of the duration of fixation ($t_g$) that is associated with the position of fixation and the similarity measure ($S_{abi}$) that is associated with the specified part.

12. A method according to claim 11 in which each individual measure is the product of the duration of fixation ($t_g$) and the measure of the degree of similarity ($S_{abi}$).

13. A method according to claim 9 in which the specified parts of the images are points within the images.

14. A method according to claim 9 in which the specified parts of the images are regions thereof.

15. A method according to claim 9 in which steps (ii) to (iv) are repeated at least once.

16. A method according to claim 9, further including the initial steps of:
 adding one or more external images to the database; and
 generating said metadata in respect of the external image(s).

* * * * *